United States Patent [19]

Spanjersberg

[11] 4,066,999
[45] Jan. 3, 1978

[54] METHOD FOR RECOGNIZING CHARACTERS

[75] Inventor: Arie Adriaan Spanjersberg, Leiderdorp, Netherlands

[73] Assignee: De Staat der Nederlanden, te Dezen Vertegenwoordigd Door de Directeur-Generaal der Posterijen, Telegrafie en Telefonie, The Hague, Netherlands

[21] Appl. No.: 690,855

[22] Filed: May 28, 1976

[30] Foreign Application Priority Data

June 2, 1975 Netherlands ............... 7506520

[51] Int. Cl.² ........................................... G06K 9/00
[52] U.S. Cl. ................... 340/146.3 S; 340/146.3 MA
[58] Field of Search ............... 340/146.3 S, 146.3 T, 340/146.3 MA

[56] References Cited

U.S. PATENT DOCUMENTS

| | | | |
|---|---|---|---|
| 3,275,986 | 9/1966 | Dunn et al. | 340/146.3 T |
| 3,341,814 | 9/1967 | Chow | 340/146.3 S |
| 3,588,823 | 6/1971 | Chow et al. | 340/146.3 S |
| 3,609,686 | 9/1971 | Savory et al. | 340/146.3 T |

*Primary Examiner*—Leo H. Boudreau
*Attorney, Agent, or Firm*—Hugh Adam Kirk

[57] ABSTRACT

Method and device for recognizing characters, in which in a learning phase, as well as in a subsequent working phase features of character patterns in a number of aspects thereof are classified in a number of groups. During the learning phase the results of these classifications are recorded in a store as statistic frequencies. During the working phase the result of the feature classification of a freshly offered character is utilized in determining, for each class of characters, (a) the probabilities of the features found in this character, and (b) the weight of the features of a character pattern to be recognized. The weight attributed to each feature depends upon the shape of the pattern, and upon the basis of the values of these weights, the features are selected. The stored statistic frequencies of the selected features are multiplied by the values of the weights, and the largest value among the results is utilized for indicating the class of the feature. Thus from the selected classes of features, the character is determined.

9 Claims, 13 Drawing Figures

FIG. 1

A POSITIVE (+) JUMP

FIG. 2

AN ADDITIONAL (OR NEGATIVE) JUMP

FIG. 3

TOO SMALL A JUMP

FIG. 4

TWO "+" JUMPS AND THREE SLOPES

FIG. 5

A NEGATIVE SLOPE

FIG. 6

A LONG GENTLE SLOPE

FIG. 7

"+" AND "−" SLOPE

FIG. 8

"−","+","−" SLOPE

FIG. 9

AN END POINT

FIG. 10

AN END POINT

FIG. 11

EXAMPLE OF END POINTS

FIG. 12

THREE ISLANDS

FIG. 14

METHOD FOR RECOGNIZING CHARACTERS

BACKGROUND OF THE INVENTION

A method of this kind is known from applicant's joint copending U.S. patent application Bilzem et al Ser. No. 490,653 filed July 22, 1974, assigned to the same assignee as the present application, now U.S. Pat. No. 3,999,161 issued Dec. 21, 1976. By this method certain characteristic features can be detected by finding out if, in the whole character to be recognized, there are portions of its geometry which are in accordance with previously given fixed definitions of characteristic features. It is generally an inconvenience, however, that if the geometry of the character portion and the definition of the feature do not fully agree, this feature is considered not to occur. This difficulty is especially experienced when dealing with handwritten characters. It can be met by so establishing the definitions of the features that the requirements are met when the features do occur, though not in their ideal or clearest form. This gives rise to another difficulty, since information is obtained as to whether a character element does or does not satisfy the definition of a feature, there are no quantitative data with regard to a more or less pronounced or distinct appearance of the relevant feature in the examined character.

SUMMARY OF THE INVENTION

The present invention offers a solution for the the above difficulties mentioned. Its solution consists in weighing and considering separately each of the features of a character pattern to be recognized since the weight attributed to each feature depends on the shape of the pattern. Then, on the basis of the values of these weights, features are selected, by multiplying the stored statistic frequencies of selected features by the values of their weights and the largest value among the results is utilized for indicating the class of that feature. Then finally considering all the selected features for determining the character.

It is to be recommended that configurations of character elements contributing to some specified feature are taken into account with the positive sign, and configurations of character elements contributing to the remaining features in the group are taken into account with the negative sign, after which the feature in each group with the largest weight is selected.

The numerical values of the weights are preferably normalized so as to make them independent of the sizes of the images. According to the copending patent application mentioned above, for each outside aspect and for each inside aspect of every character, a choice is made from four groups of features, and one feature is being chosen from each of the groups.

In the learning phase, the probability P for the feature K to be found in a character to be recognized (e.g., one of the figures 0 ... 9, belonging to class $i$), is determined for each of the K possible features in the system.

This is indicated in the following table:

The quantity $PKi$ is determined by counting the characters of one class $i$ in which the feature $K$ is found. Normalization is effected by dividing the values found by $ni$, which is the number of characters of class $i$ occurring in the learning material.

Example: $PKi = 9000/10000$, which means that the feature $K$ is found in 9000 of the 10000 class $i$ characters offered.

The detection of the features always consists in the choice of one feature out of a group, e.g., the group of the jumps. So this choice is always concerned with one of the possible configurations of jumps employed in the system. The chosen feature is given the weight 1, the weight 0 being attributed to all the other features.

According to the invention a more sophisticated version is obtained by indicating the weights attributed to the features more precisely. The process is such that for each aspect, the weight attributed to each of the features is computed and then recorded as a numerical quantity. From each group (jumps, slopes, etc.) the feature having the largest weight ($gk$) is chosen in the first instance.

In the well-known manner it is achieved that for deriving the features of each pattern, use is made of a subset $x$ of the set of possible characteristics. Thus it is imaginable that for end points and islands, the inside aspects are not used, so that instead of $4 \times 8 = 32$ aspects for four groups of features according to the above table, only $8 + 8 + 4 + 4 = 24$ aspects are utilized.

A character is assigned to the class for which $$\sum_{1}^{24} gk\cdot PKi$$

has the largest value. The method for determining the weights ($gk$) will now be described for each of the groups of features separately.

BRIEF DESCRIPTION OF THE VIEWS

The above mentioned and other features, objects and advantages, and a manner of attaining them are described more specifically below by reference to embodiments of this invention shown in the accompanying drawings, wherein.

DETAILED DESCRIPTION OF PREFERRED EMBODIMENTS

I. Jumps

Figure 1:
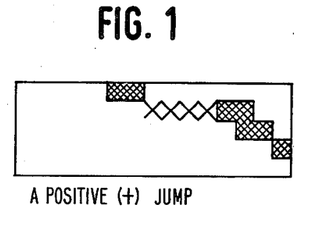
FIG. 1 shows a positive jump in a character pattern.

The weight of a jump is measured by the number of white image elements between the end of an intersection and the beginning of an intersection on the next line (FIG. 1) of an image the character has been converted into by a well known process. This is because only the first transition or mark in each scan line is detected, and not any thereafter.

As in the definition stated in applicant's joint copending patent application mentioned above, a distinction is drawn between positive and negative jumps. For determining the weights of the jump configurations, use is made of a counter which is capable of counting the jumps in an aspect. The maximum number that can be counted is three. Further there are two registers for each jump. Whenever a jump occurs, the white image elements that determine the weight of the jump are counted. Dependent on whether it is a positive or a negative jump this number is stored in the corresponding registers.

| jump | pos(itive) | neg(ative) |
|------|------------|------------|
| S1   | p1         | n1         |
| S2   | p2         | n2         |
| S3   | p3         | n3         |

The references $p1 \ldots p3$ and $n1 \ldots n3$ indicate the weights.

The following jump configurations and associated weights are distinguished:

Table A

| code | description | weight | definition |
|------|-------------|--------|------------|
| S0 | no jumps | g0 | $\frac{1}{2} B - \Sigma e$ |
| S1 | 1 pos.jump | g1 | $p\,max - (\Sigma e - p\,max) = 2 \cdot p\,max - \Sigma e$ |
| S2 | 1 neg.jump | g2 | $n\,max - (\Sigma e - n\,max) = 2 \cdot n\,max - \Sigma e$ |
| S3 | 1 pos.jump + 1 pos.jump | g3 | $p\,max^{-1} - (p,n)\,min$ |
| S4 | 1 neg.jump + 1 neg.jump | g4 | $n\,max^{-1} - (p,n)\,min$ |
| S5 | 1 pos.jump + 1 neg.jump | g5 | $(p\,max, n\,max)\,min - [\Sigma e - (p\,max + n\,max)]$ |
| S6 | more than two jumps | g6 | $(S3) \cdot (p,n)\,min$ |

In the above table
B = the width or height of the character image;
$\Sigma e$ = the sum of all the intermediate white image elements included in the jumps in one aspect;
p max = the largest of the three numbers p1, p2 and p3, indicating the largest positive jump;
n max = the largest of the three numbers n1, n2 and n3, indicating the largest negative jump;
$p\,max^{-1}$ = the second largest value of p1, p2 and p3;
$n\,max^{-1}$ = the second largest value of n1, n2 and n3;
(p,n) min = the smallest of the numbers 1 ... p3 and n1 ... n3;
(p max, n max) min = the smaller of the numbers p max and n max;
(S3) = 1, if (p3, n3) ≠ 0; = 0, if (p3, n3) = 0.

It can be seen from this list of formulae and from similar lists and examples to be given in what follows that configurations of image elements contributing to a specified feature are taken into account with a positive sign and that configurations of image elements contributing to the other features of the relevant group are taken into account with a negative sign.

Figure 2:
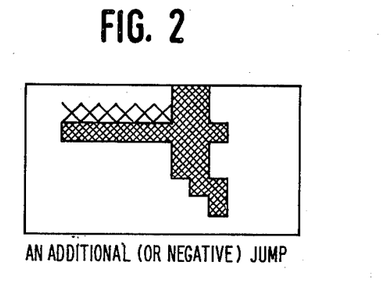
FIG. 2 shows an additional or negative jump in a character pattern.

In this connection two examples will be given, it being observed that, if the distance between the beginning points of two intersections that do join is equal to or larger than half the width or height of the character image, this will be regarded as a jump (additional or negative jump, FIG. 2).

Figure 3:
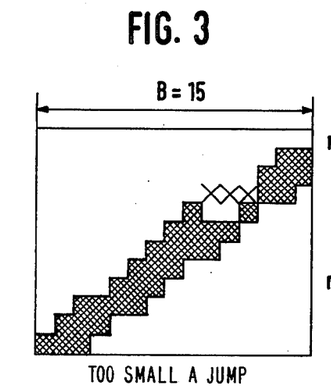
FIG. 3 shows too small a jump to be effectively considered in a character pattern.

EXAMPLE 1 (FIG. 3).

Scanning result (left aspect):

| | | |
|---|---|---|
| S1 | p1 = 0 | n1 = 3 |
| S2 | p2 = 0 | n2 = 0 |
| S3 | p3 = 0 | n3 = 0 |

Computation of the weights:

$$g0 = 8 - 3 = 5$$

from first line in Table A above, and B = 15 (see FIG. 3) and $\Sigma e = 3$ $$g1 = 0 - 3 = -3$$
$$g2 = 6 - 3 = 3$$
$$g3 = 0 - 0 = 0$$
$$g4 = 0 - 0 = 0$$
$$g5 = 0 - 0 = 0$$
$$g6 = 0 - 0 = 0$$

Conclusion: In a character of the class according to FIG. 3 the weight g0 is the largest, i.e., the feature S0 (no jumps) is preferred. Evidently the one (negative)

jump is too small to be of any interest. Next the weight $g2$ is the largest for feature S2 (one negative jump). The weight $g1$ is negative, i.e., the associated feature is still less important.

Figure 4:
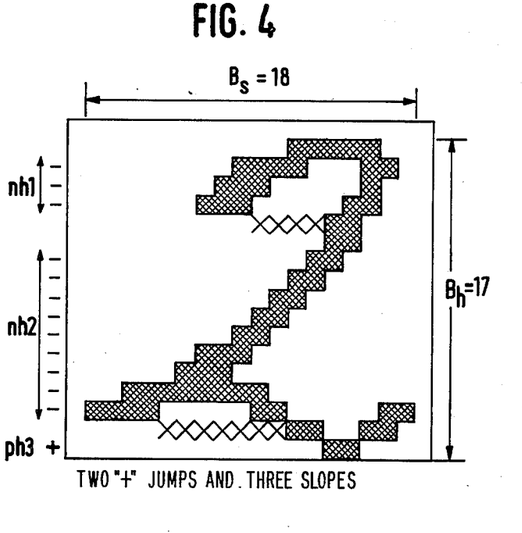
FIG. 4 shows two positive jumps and three slopes in a character pattern for a handwritten Arabic numeral "2;"

EXAMPLE 2 (FIG. 4)

Scanning result left aspect:

| | $B = Bs = 18$ | |
|---|---|---|
| S1 | $p1 = 4$ | $n1 = 0$ |
| S2 | $p2 = 7$ | $n2 = 0$ |
| S3 | $p3 = 0$ | $n3 = 0$ |

Computation of the weights:
$g0 = 9 - 11 = -2$
$g1 = 7 - 4 = 3$
$g2 = 0 - 11 = -11$
$\boxed{g3 = 4 - 0 = 4}$
$g4 = 0 - 0 = 0$
$g5 = 0 - 4 = -4$
$g6 = 0 - 0 = 0$ Conclusion: In a character of the class according to FIG. 4 the weight $g3$ is the largest, i.e, the feature S3 (two positive jumps) is preferred, immediately followed by the feature of one positive jump (cf. $g1$ for S1). The weight $g2$ for the occurrence of one negative jump (S2) is very negative ($-11$), so that it, the corresponding one negative jump feature, is not fit for being considered.

II. Slopes

Figure 5:
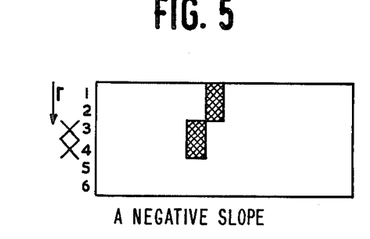
FIG. 5 shows a negative slope in a character pattern.

The weight attributed to a slope configuration is determined by the number of scanning lines covered by the configuration. In what follows the slope is defined in a somewhat different manner than in the system according to applicant's copending patent application mentioned above. There is a slope when in two or more successive lines the distance to the side of the enclosing rectangle is different. This definition also includes a one element shift on one line, when no change of distance occurs on the next line. See FIG. 5. In this case the left aspect exhibits a negative slope on lines 3 and 4. When the line segment continues beyond that point every second line is counted. See FIG. 6.

Figure 6:
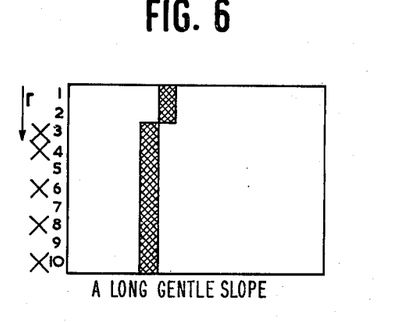
FIG. 6 shows a long gentle negative slope in a character pattern.

Thus the weight of the negative slope is 5. A slope always ends in a jump or in an additional jump.

The maximum number of successive slopes that can be recorded in an aspect is limited to 4.

Figure 7:
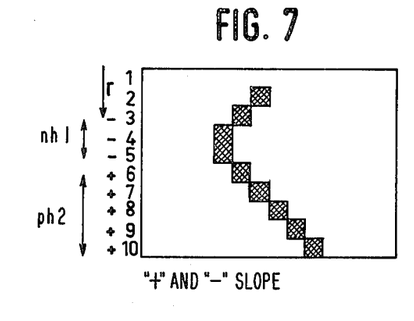
FIG. 7 shows a slope in a character pattern having a positive and a negative part.

In a compound slope configuration, e.g., a negative slope followed by a positive slope, the weight is determined by the degree of similarity of the two partial areas (symmetry of the slopes). See FIG. 7. The first slope in the left aspect is negative ($nh\ 1$) over three lines. The second slope is positive ($ph\ 2$) over five lines. The weight of the feature "negative slope, positive slope" is found by determining the smaller value of the two numbers $nh\ 1$ and $ph\ 2$ and multiplying this value by 2. Notation: $2\ (nh\ 1, ph\ 2)$ min. So the weight is $2 \times 3 = 6$. In the example according to FIG. 8 the feature "negative slope, positive slope, negative slope" must get the largest weight. The weight is determined by taking the smallest value of the numbers $nh\ 1$, $ph\ 2$, and $nh\ 3$ and multiplying it by 3. Notation: $3\ (nh\ 1, ph\ 2, nh\ 3)$ min.

Figure 8:
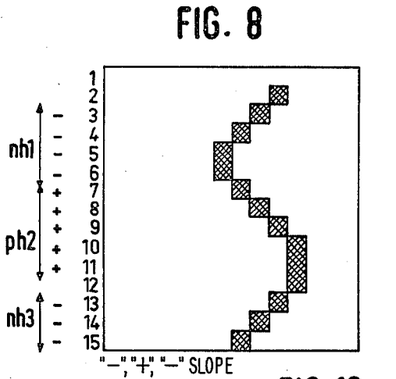
FIG. 8 shows a negative-positive-negative slope in a character pattern.

So in the above example the weight of the feature: "neg., pos., neg." is $3 \times 3 = 9$.

To record the values of the successive slopes eight registers are utilized, viz: $ph\ 1 \ldots ph\ 4$ and $nh\ 1 \ldots nh\ 4$. The $ph$-registers contain the data of the positive slopes and the $nh$-registers those of the negative slopes. Cases are distinguished in which both registers $ph\ 4$ and $nh\ 4$ are empty; notation: $(p,n)\ h\ 4 = 0$. So in these cases an aspect presents three slopes at the most. The following slope configurations and associated weights can be distinguished.

Table B

| code | description | weight | definition |
|---|---|---|---|
| H0 | no slopes | g0 | $[\frac{1}{2} B - \Sigma h]$   HE 4 |
| H1 | positive slope | g1 | $[ph\ max - (\Sigma h - ph\ max)] \cdot$ HE 4 |
| H2 | negative slope | g2 | $[nh\ max - (\Sigma h - nh\ max)] \cdot$ HE 4 |
| H3 | pos.pos.slope | g3 | largest value of: $[2\{(ph\ 1, ph\ 2)\ min - (p, n)\ h\ 3\}] \cdot$ HE 4 and $[2\{(ph\ 2, ph\ 3)\ min - (p, n)\ h\ 1\}] \cdot$ HE 4 |
| H4 | pos.neg.slope | g4 | largest value of: $[2\{(ph\ 1, nh\ 2)\ min - (p, n)\ h3\}] \cdot$ HE 4 and $[2\{(ph\ 2, nh\ 3)\ min - (p, n)\ h1\}] \cdot$ HE 4 |
| H5 | neg.pos.slope | g5 | largest value of: $[2\{(nh\ 1, ph\ 2)\ min - (p, n)\ h3\}] \cdot$ HE 4 and $[2\{(nh\ 2, ph\ 3)\ min - (p, n)\ h1\}] \cdot$ HE 4 |
| H6 | neg.neg.slope | g6 | largest value of: $[2\{(nh\ 1, nh\ 2)\ min - (p, n)\ h3\}] \cdot$ HE 4 and $[2\{(nh\ 2, nh\ 3)\ min - (p, n)\ h1\}] \cdot$ HE 4 |
| H7 | pos.pos.neg. | g7 | largest value of: $3\{(ph\ 1, ph\ 2, nh\ 3)\ min - (p, n)\ h4\}$ and $3\{(ph\ 2, ph\ 3, nh\ 4)\ min - (p, n)\ h1\}$ |
| H8 | pos.neg.pos. | g8 | largest value of: $3\{(ph\ 1, nh\ 2, ph\ 3)\ min - (p, n)\ h4\}$ and $3\{(ph\ 2, nh\ 3, ph\ 4)\ min - (p, n)\ h1\}$ |
| H9 | pos.neg.neg. | g9 | largest value of: $3\{(ph\ 1, nh\ 2, nh\ 3)\ min - (p, n)\ h4\}$ and $3\{(ph\ 2, nh\ 3, ph\ 4)\ min - (p, n)\ h1\}$ |
| H10 | neg.pos.pos. | g10 | largest value of: $3\{(nh\ 1, ph\ 2, ph\ 3)\ min - (p, n)\ h4\}$ and $3\{(nh\ 2, ph\ 3, ph\ 4)\ min - (p, n)\ h1\}$ |
| H11 | neg.pos.neg. | g11 | largest value of: $3\{(nh\ 1, ph\ 2, nh\ 3)\ min - (p, n)\ h4\}$ and $3\{(nh\ 2, ph\ 3, nh\ 4)\ min - (p, n)\ h1\}$ |

Table B-continued

| code | description | weight | definition |
|---|---|---|---|
| H12 | neg.neg.pos. | g12 | largest value of:<br>3{(nh 1, nh 2, ph 3) min − (p, n) h4}<br>and<br>3{(nh 2, nh 3, ph 4) min − (p, n) h1} |
| H13 | neg.pos.neg.pos. | g13 | 4 (nh 1, ph 2, nh 3, ph 4) min |
| H14 | 4 slopes | g14 | 4{(p, n) h1, (p, n) h2, (p, n) h3, (p, n) h4} · {G 13} |

In the above table
B = width or height of pattern;
Σh = sum of all slope values;
HE 4 = 1 if (p, n) h4 = 0  = 0 if (p, n) h4 ≠ 0
G 13 = 1 if g13 = 0  = 0 if g13 ≠ 0.

The slope configurations "pos.pos.pos." and "neg.neg.neg." have been cancelled, because they occur very seldom. On the other hand the configuration having four slopes, "neg.pos.neg.pos." has been included (H13), because this very configuration is expected to occur frequently in the characters 3 and 8.

EXAMPLE (FIG. 4 left aspect).

$$B = Bh = 17$$
$$\Sigma h = 14$$

| | |
|---|---|
| ph 1 = 0 | nh 1 = 3 |
| ph 2 = 0 | nh 2 = 9 |
| ph 3 = 1 | nh 3 = 0 |
| ph 4 = 0 | nh 4 = 0 | g0 = 9 − 13 = − 4
g1 = 1 − 12 = − 11
g2 = 9 − (13 − 9) = + 5
g3 = −2
g4 = 0 −2
g5 = 0 − 2 = −2
g6 = 6 − 2 = +4
g7 = 0
g8 = 0
g9 = 0
g10 = 0
g11 = 0
g12 = 3 − 0 = +3
g13 = 0
g14 = 0.

III. End points

Figure 9:
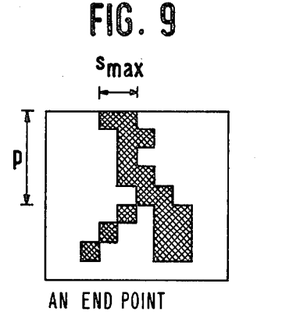
FIGS. 9 and 10 show end points in two different character patterns.

End points are characterized in that the number of image elements $s$ occupied by the line thickness is smaller than the number of lines $p$ covered by the line segment (FIG. 9). When the left outside aspect is being dealt with for detecting jumps and slopes, the end point configuration for the outside aspect is formed at the same time. Going from top to bottom, the lines containing image information are shifted to the left out of the matrix. At every step during this process it is tested how many united image elements $s$ the line thickness comprises. This number is temporarily stored in a working register. When a value of $s$ is found which exceeds the value in the register, this fresh value ($s$ max) is recorded. Further the number of lines $p$ covered by the end point is counted. At every line the ratio $p/s$ max is determined anew. If the freshly determined value exceeds the value temporarily stored in a register, the new value is recorded. Thus the maximum value of the ratio $p/s$ max occurring during the forming of the end point configuration is obtained. In the example of FIG. 9 the maximum of the ratio $p/s$ max = (5/2) →2. This value determines the weight attributed to the feature.

In each outside aspect the positions of the extremities are determined first. An extremity occurs when, reckoned from the outside of the rectangle, the first intersection with the image area is found. The position of the extremity is the extreme black image element of the intersection.

Figure 10:
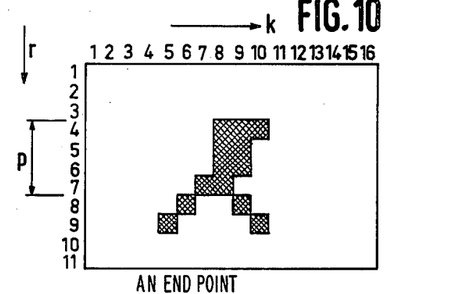

In the example of FIG. 10 the extremity, in the top aspect, is found at the position $k = 10$, $r = 4$. The count of the number of lines covered by the end point is terminated as soon as no correct connection of two successive intersections is found. An OR-function is made of the successive lines of the image. When line $n$ is added to the OR-function, a test is made as to whether the intersection in line $(n-1)$, associated with an end point, consists of united black image elements within the OR-area. Only if that is the case, line $(n-1)$ contributes to the value of the end point. In the new method of determining features the same end point configurations are distinguished as in the system according to applicant's copending patent application mentioned above. The coding indicates whether the extremities of end points occur in the upper part or in the lower part of an aspect.

The values found for the end points, which are related to the positions of the relevant extremities, are recorded in four registers $b$ 1,2 and $o$ 1,2. The values of the end points found in the upper part of the aspect are recorded in the registers $b1$ and $b2$; the values of the end points in the lower part of the aspect are recorded in the registers $o1$ and $o2$.

End point configurations and associated weights:

Table C

| code | description | weight | definition |
|---|---|---|---|
| EP 0 | no end points | g0 | 2 − (b1 + b2 + o1 + o2) |
| EP 1 | 1 end point above | g1 | (b 1,2)max − {(b 1,2)min + o1 + o2} |
| EP 2 | 1 end point below | g2 | (o 1,2)max − {o 1,2)min + b1 + b2} |
| EP 3 | 2 end points above | g3 | (b 1,2)min − (o 1,2)max |
| EP 4 | 1 end point above, 1 below | g4 | {(b 1,2)max,(o 1,2)max} min − {(b 1,2) min + (o 1,2)min} |
| EP 5 | 2 end points below | g5 | (o 1,2)min − (b 1,2)max |
| EP 6 | more than 2 end points | g6 | 3 × (b 1,2 o 1,2)min, this minimum being ≠ 0 and not more than one register being empty. |

Figure 11:
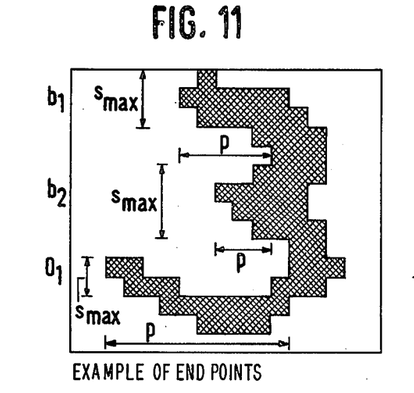
FIG. 11 shows an example of end points in the character pattern of a handwritten Arabic numeral "3;"

For the end points of the left aspect in the example of FIG. 11 the following maximum values of the ratio $p/s$ max are recorded:

$$b1 \frac{5}{3} \longrightarrow 1$$

-continued $b2 \frac{3}{4} \longrightarrow 1$ $o1 \frac{10}{2} \longrightarrow 5$ $o2 \longrightarrow 0$ The weights computed by the definitions given:

$$g0 = -5$$
$$g1 = -5$$
$$g2 = +3$$
$$g3 = -4$$
$$g4 = 0$$
$$g5 = -1$$
$$g6 = +3$$

So the feature: more than two end points has the same weight as the feature: one end point below.

IV. Islands

The manner in which islands are formed from the original character pattern is the same as in the known system. The further processing operations, however, are entirely different in the above mentioned copending patent application.

After the islands have been formed, the extremity, i.e. the line on which the island is observed for the first time, is determined for each island and a test is made as to whether it occurs in the upper half or in the lower half of an aspect. It is obvious that this is done for each of the four outside aspects.

We distinguish the following configurations:

EL 0—no islands;
EL 1—one island, extremity above;
EL 2—one island, extremity below;
EL 3—two islands, two extremities above;
EL 4—two islands, one extremity above, one below;
EL 5—two islands, two extremities below;
EL 6—more than two islands.

The weight of each feature is determined by the number of lines covered by the island. In order to determine, in a simple manner, the extreme value and the number of lines of an island, the "OR"-function is formed of every two successive lines. As long as the intersection of an island constitutes an uninterrupted series of black image elements, it belongs to the relevant island.

Four registers $e1$, $e2$, $f1$ and $f2$ ensure the recording. In the case of islands the extremities of which lie in the upper part of the aspect the total number of lines for the relevant aspect, is recorded in the registers $e1$ and $e2$. In the case of islands the extremities of which occur in the lower part of the aspect, the relevant total is recorded in the registers $f1$ and $f2$.

So in one image half two island extremities can be treated at the most. If there are more in one image half, the excess extremities and, consequently, the relevant islands are ignored.

The following island configurations and associated weights are distinguished:

Table D

| code | description | weight | definition |
|------|-------------|--------|------------|
| EL 0 | no islands | g0 | $\frac{1}{4}B - (e1 + e2 + f1 + f2)$ |
| EL 1 | 1 island, extr. above | g1 | $(e1, 2)max - \{(e1, 2)min + f1 + f2\}$ |
| EL 2 | 1 island, extr. below | g2 | $(f1, 2)max - \{(f1, 2)min + e1 + e2\}$ |
| EL 3 | 2 islands, 2 extr. above | g3 | $2(e1, 2)min - (f1 + f2)$ |
| EL 4 | 2 islands, 1 extr. above 1 extr. below | g4 | $2\{(e1, 2)max'(f1, 2)max\}min - \{(e1, 2)min + (f1, 2)min\}$ |
| EL 5 | 2 islands, 2 extr. below | g5 | $2(f1, 2)min - (e1 + e2)$ |
| EL 6 | more than 2 islands | g6 | $3 \times (e1, 2, f1, 2)min$, this minimum being $\neq 0$ and not more than 1 register being empty. |

Figure 12:
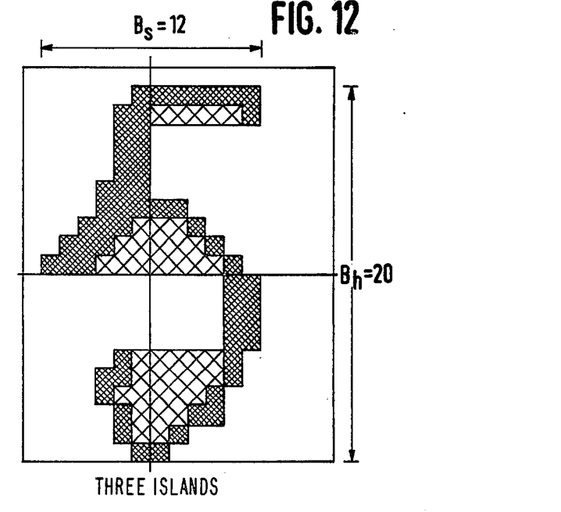
FIG. 12 shows three islands in a handwritten character pattern of an Arabic numeral "5;"

For the data of the top aspect, according to the example of FIG. 12, the following weights are found:

$e1 = 1$
$e2 = 3$
$f1 = 5$
$f2 = 0$
$B = 20$ $g0 = \frac{20}{4} - (1 + 3 + 5 + ) = 5 - 9 = -4.$
$g1 = 3 - (1 + 5 + 0) = 3 - 6 = -3.$
$g2 = 5 - (0 + 1 + 3) = 5 - 4 = +1.$
$g3 = 2.1 - (5 + 0) = 2 - 5 = -3.$
$g4 = 2.3 - (1 + 0) = 6 - 1 = +5.$
$g5 = 2.0 - (1 + 3) = 0 - 4 = -4.$
$g6 = 3.1 \quad = \quad = +3.$ The feature "two islands, one extremity above, one extremity below" has the largest weight. From the same image the following data are found for the left aspect:

$e1 = 7$
$e2 = 6$
$f1 = 5$
$f2 = 0$
$B = 12$ weights:
$g0 = \frac{12}{4} - (7 + 6 + 5 + 0) \quad = 3 - 18 = -15$
$g1 = 7 - (6 + 5 + 0) \quad = 7 - 11 = -4$
$g2 = 5 - (0 + 7 + 6) \quad = 5 - 13 = -8$
$g3 = 2.6 - (5 + 0) \quad = 12 - 5 = +7$
$g4 = 2.5 - (6 + 0) \quad = 10 - 6 = +4$
$g5 = 2.0 - (7 + 6) \quad = 0 - 13 = -13$
$g6 = 3.5 \quad\quad\quad\quad\quad = +15$ The feature "more than two islands" has the largest weight.

V. The judging processor apparatus a. Maximum selector: binary feature components (FIG. 13).

On the basis of the above feature selection, there are several methods of carrying out this judging procedure. The simplest method is the one in which the existing judging method is approximated as much as possible. Thus it could appear whether merely a better determination of the features, already leads to an improvement.

Figure 13:
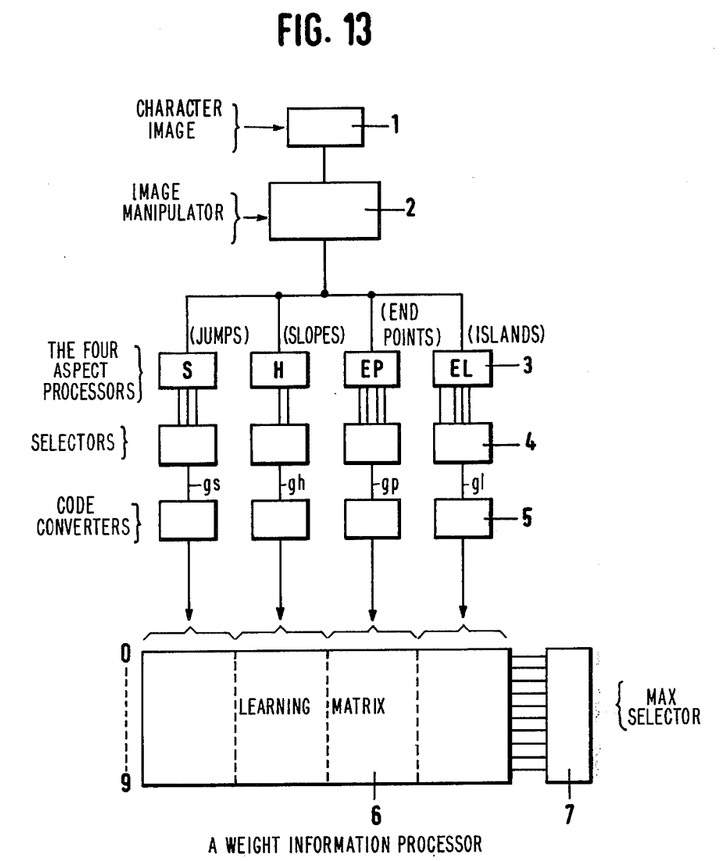
FIG. 13 is a schematic block wiring diagram of one embodiment of a circuit according to this invention for the processing of maximum binary weighted feature information.

The block diagram of the system can be as indicated in FIG. 13. In this figure the reference numeral 1 designates a character image, to which is connected an image manipulator 2 by means of which the four outside aspects and the four inside aspects are formed. Each of the aspect processing units 3 compute, in the described manner, weight of each of the configurations in each of the groups of features (jumps S, slopes H, end points EP, and islands EL). The jump S processing unit comprises six registers for jumps P1-3 and N1-3; the slopes H unit comprises eight registers or slopes $ph1-4$, $nh1-4$;

the end points EP unit comprises four registers for $b$1-2, $o$1-2; and the islands EL unit comprises four registers for $e$1-2, $f$1-2. For each group, selectors 4 are utilized for determining the highest weights computed by the processors 3. As a result of these operations four values $g_s$, $g_h$, $g_p$ and $g_l$ are available per aspect for the four respective feature groups S, H, EP and EL.

The judging processor in its simplest embodiment does not utilize the numerical values $g_s$, $g_h$, $g_p$ and $g_l$, but only employs the statistic frequencies of occurrence of the selected features in characters of the various classes. When a feature $x$ is selected, because the value of weight $g_x$ is the highest in the group of features to which $x$ belongs, the relevant character belonging to class $y$, the content of the storage position $P_{xy}$ in a learning matrix 6, is increased by one in the learning phase. The storage position is indicated by means of code converters 5, which indicate the relevant line of the learning matrix.

At the end of the learning phase the content of a storage position $P_{xy}$ has the value $S_{xy}$, which indicates the number of times the feature ($x$) was selected in images of class $y$. The probability of a character of class $y$, when the feature $x$ has been selected is $K(y|x)$ for which $$K(y|x) = \frac{S_{xy}}{\overset{k}{\Sigma} S_{xy}}$$

In this expression $$\overset{k}{\Sigma} S_{xy}$$

is the sum of all the characters in the learning set for which the feature $x$ was selected.

Then, at the end of the learning phase, the logarithm of all the probabilities $K(y|x)$ is determined.

Consequently: $K(y|x)_L = \log K(y|x)$.

The (logarithmic) probability for a character to belong to class $y$ is found in the working phase by summing the logarithmic probabilities of all the selected features $$K(y)_L = \overset{x}{\Sigma} K(y|x)_L$$

by means of a maximum selector 7.

If there are features which, within one group, have the same weights, operations in the learning phase are carried out as if there are different images, of which, consequently, all the selected features are recorded. In the working phase, in that case, the recognition is carried out for the various representations. If the results are contradictory, the relevant character is rejected.

b. Judging processor with weighted feature components. (FIG. 14)

Figure 14:
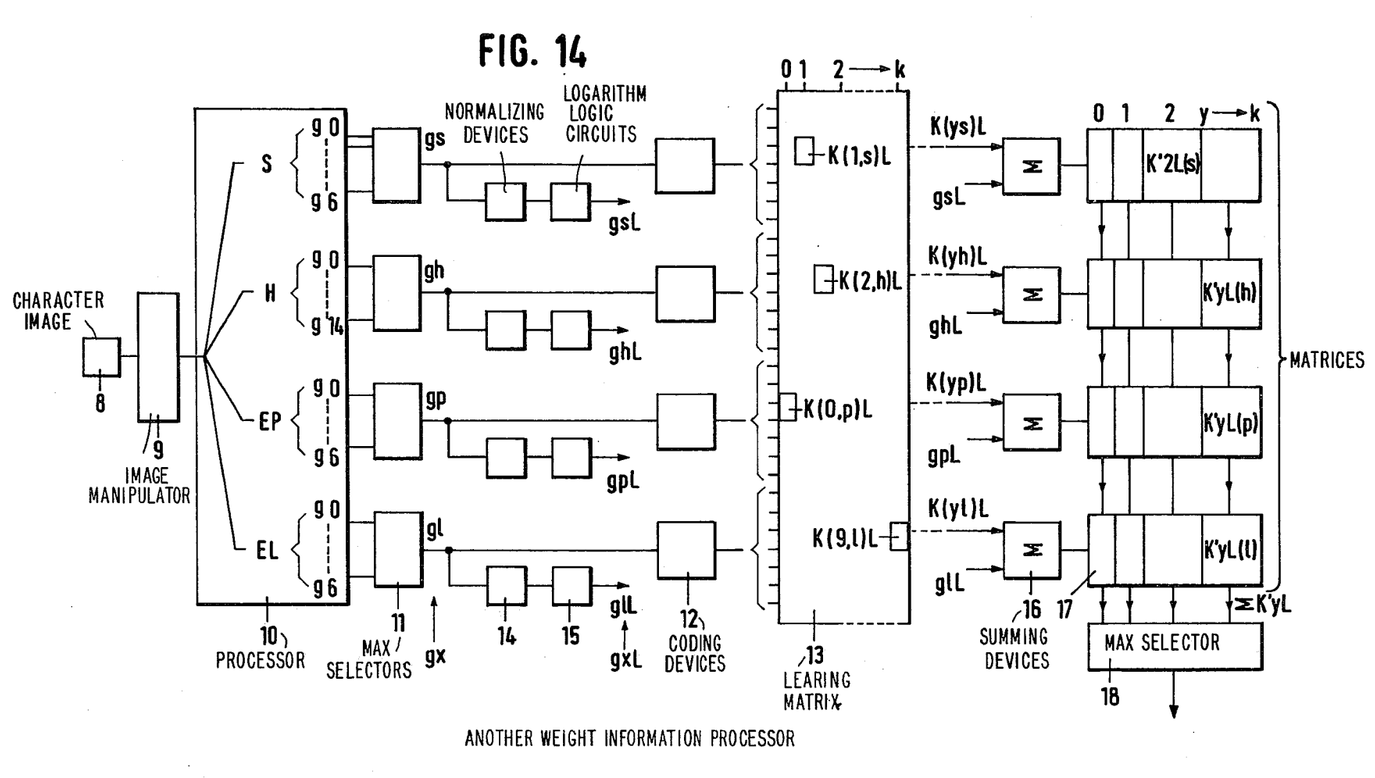
FIG. 14 is a more detailed schematic block wiring diagram of another embodiment of a circuit of this invention for processing weighted feature information.

FIG. 14 shows how during the learning phase a learning matrix is filled and how during the working phase an image is recognized, in such a manner that use can be made of the numerical values of the features.

During the learning phase as well as during the working phase aspects are offered, by means of an image manipulator 9, of each character image 8 to be processed. The weights are computed in a processor unit 10. In each aspect a maximum selector 11 determines the largest weight ($g_x$) for each feature group. By means of a coding device 12 that line in a learning matrix 13 is indicated which corresponds to the relevant selected feature. In the known way, during the learning phase, the content of a storage position $xy$ is increased by one, if feature $x$ is found in a character of class $y$. So during the learning phase each storage position of the learning matrix contains a sum $S(y|x)$ being the number of times the feature ($x$) was selected in images of class $y$. At the end of the learning phase, by a process identical to the one utilized in the first embodiment of the judging processor (FIG. 13), the probability of a character of class $y$ can be determined, when the feature $x$ has been selected:

$$K(y|x) = \frac{S_{xy}}{\overset{k}{\Sigma} S_{xy}}$$

As, for the classification of images, the product probabilities for all the selected features are utilized, in this embodiment of the judging processor too, the calculations are carried out with logarithmic values of the probabilities. At the end of the learning phase each storage position of the learning matrix contains the logarithmic probability of a character of class $y$, when the feature $x$ has been selected:

$K(y|x)_L = \log K(y|x)$.

In the subsequent working phase the largest weight ($g_x$) of each character image offered is determined, equally per aspect, for each group of features. The numerical value of this weight is normalized by a division by the dimension $B$ (width or height) of the image. This is done in a normalizing device 14. Next the logarithmic values of the normalized weights are determined by logic circuits 15.

The logarithmic weight of the selected feature:

$g_{xL} = \log (g_x/B)$.

The weighted probability for an image of class $y$ to occur, when a feature $x$ having a weight $gx$ has been selected, is:

$K_y'(x) = K(y|x) \cdot (g_x/B)$.

The logarithmic probability:

$K_{yL}'(x) = \log K_y'(x)$

This probability is found by summing the logarithmic probability $K(y|x)_L$ stored in the learning matrix and the logarithmic normalized weight $g_{xL}$:

$K_{yL}'(x) = K(y|x)_L + g_{xL}$

As shown in FIG. 14 there is a summing device 16 for each group of features. In each group of features the summation for the selected feature is carried out per aspect for all the classes. Consequently, a second matrix 17 having $k$ columns is formed, the number $k$ corresponding to the number of character classes, the number of lines corresponding to the number of selected features multiplied by the number of aspects. After the second matrix has been filled, in view of the recognition of an image, the logarithmic probability for the character to belong to class $y$ is found by summing the probabilities $K_{yL}'(x)$.

This sum is $\overset{x}{\Sigma} K_{yL}'$

The pattern is assigned to the class for which $$\overset{x}{\Sigma} K_{yL}'$$

is the highest. The highest value is determined by means of a maximum selector 18. The introduction of weights as described above by the addition of the circuits 14, 15, 16, and 17 to the circuit of FIG. 13, provides an improved method of determining the features of a character image; moreover the computed weights can be used for the classification of images, for which purpose the selected weights are preferably normalized in accordance with the dimensions of the images, the classification of an image being determined, on one hand, by the statistical frequencies, occurring in the utilized learning set, of the features selected for the relevant character image and, on the other hand, by the weights of the features selected for the relevant image.

While there is described above the principles of this invention in connection with specific apparatus, it is to be clearly understood that this description is made only by way of example and not as a limitation to the scope of this invention.

What I claim is:

1. A device for recognizing characters comprising:
   A. means for manipulating the pattern of each character for scanning said pattern from a plurality of aspects,
   B. means for detecting a plurality of features in each aspect and classifying the detected features in each of the aspects in a plurality of groups,
   C. a plurality of register means for recording the number of times the detected features of each aspect occur for each class of patterns of the same character,
   D. means for weighing the features detected in each pattern depending upon the shape of the pattern,
   E. means for selecting features of the characters on the basis of the values of said weights,
   F. a matrix means for multiplying the values of the weights by the number of times that feature has been stored in said recording means, and
   G. means for selecting the largest multiplied value for indicating the class of the features and the character to be recognized.

2. A device according to claim 1 including means for contributing a positive sign to a specific feature in a given aspect and contributing negative signs to the remaining features in said given aspect.

3. A device according to claim 1 including means for normalizing the weighed features so as to make them independent of sizes of the characters.

4. A device for recognizing characters comprising:
   A. means for recording successively the image of each character to be recognized,
   B. means for manipulating each recorded image for scanning it from different directions to detect a predetermined number of aspects of the pattern of each character,
   C. means for weighing each feature detected in each of said aspects of each character,
   D. means for selecting the features having the maximum weights in each processed aspect of each character,
   E. a learning matrix means for storing the resulting selected maximum weights according to the position of the features in the aspect of each character for all the characters to be recognized,
   F. means for adding the values of each weight to be stored to the value of weights already stored for that feature at that location in said learning matrix means, and
   G. means for selecting the maximum of the added results for indicating the class of the character to be recognized.

5. A device according to claim 4 wherein said manipulation means scans the recorded image of each character from four different outward and four different inward directions.

6. A device according to claim 4 wherein said features include jumps, slopes, end points and islands in the patterns of each character from each aspect.

7. A device according to claim 4 including means for normalizing the images to make them independent of their size.

8. A device according to claim 4 wherein said means for weighing gives the features having the maximum weight a positive sign and the other features in that aspect a negative sign.

9. A device for recognizing characters comprising: an image manipulator (9); a learning matrix (13); a number of processing units (10) for computing the number of jumps, slopes, end points, and islands are features of a character when scanned from four different inside and outside directions as aspects, and determining the weights of these features per aspect depending upon the shape of the pattern of the character to be recognized; a number of maximum selectors (11) for choosing, from each group of features per aspect, the feature having the highest weight; a number of coding devices (12) for completing, during the learning phase, a store of the learning matrix for each of the highest values; a number of normalizing devices (14) for establishing a relation between the value determined by the selectors (11) and the size of the image in the same aspect; a number of logic circuits (15) for determining the logarithmic values of the results obtained by the normalizing devices (14); a number of summing circuits (16) for adding the logarithmic values obtained from the logic circuits (15) to the logarithmic values of the values recorded per aspect in the learning matrix for the relevant feature in all the character classes; a second matrix (17) for storing, for all the character classes, the logarithmic values found in the summing devices (16) and a maximum selector (18) for determining the highest value of the sum of the feature values for all the aspects of all classes of characters.

* * * * *

UNITED STATES PATENT OFFICE
CERTIFICATE OF CORRECTION

PATENT NO. : 4,066,999
DATED : January 3, 1978
INVENTOR(S) : Arie Adriaan Spanjersberg It is certified that error appears in the above-identified patent and that said Letters Patent are hereby corrected as shown below:

Column 4, eighth line of notes below Table A, change "1" to -- p1 --.

Column 7, first column of Table "EXAMPLE (FIG. 4 left aspect)", line 5, cancel "0" after "g4 =". Column 9, line 36, before the period insert -- in the above mentioned copending application --; lines 37 and 38, cancel "in the above mentioned copending application".
Column 10, Table D, fourth column, line 2, change "=" to -- + -- between "f1" and "f2"; line 22, in table line 1, before ")" insert -- 0 --.
Column 11, line 5, change "$g_g$" to -- $g_s$ --; line 6, change "$g_{hr}$" to -- $g_h$ --; line 9, change "$g_g$" to -- $g_s$ -- and "$g_h$" to -- $g_1$ --.

Column 14, line 38, change "are" to -- as --.

Signed and Sealed this

Twenty-fifth Day of July 1978

[SEAL]

Attest:

RUTH C. MASON
Attesting Officer

DONALD W. BANNER
Commissioner of Patents and Trademarks

UNITED STATES PATENT OFFICE
CERTIFICATE OF CORRECTION

Patent No. 4,066,999　　　　　　　　　　Dated January 3, 1978

Inventor(s) Arie Adriaan Spanjersberg

It is certified that error appears in the above-identified patent and that said Letters Patent are hereby corrected as shown below:

Column 6, line 7, after "See FIG. 6." insert -- Thus the weight of the negative slope is 5. --; line 8, delete "Thus the weight of the negative slope is 5." .

Signed and Sealed this

Twenty-second Day of August 1978

[SEAL]

Attest:

RUTH C. MASON
Attesting Officer

DONALD W. BANNER
Commissioner of Patents and Trademarks